O. HUTCHINS.
METHOD FOR THE PRODUCTION OF SILICON TETRACHLORID.
APPLICATION FILED OCT. 30, 1917.
1,271,713.
Patented July 9, 1918.
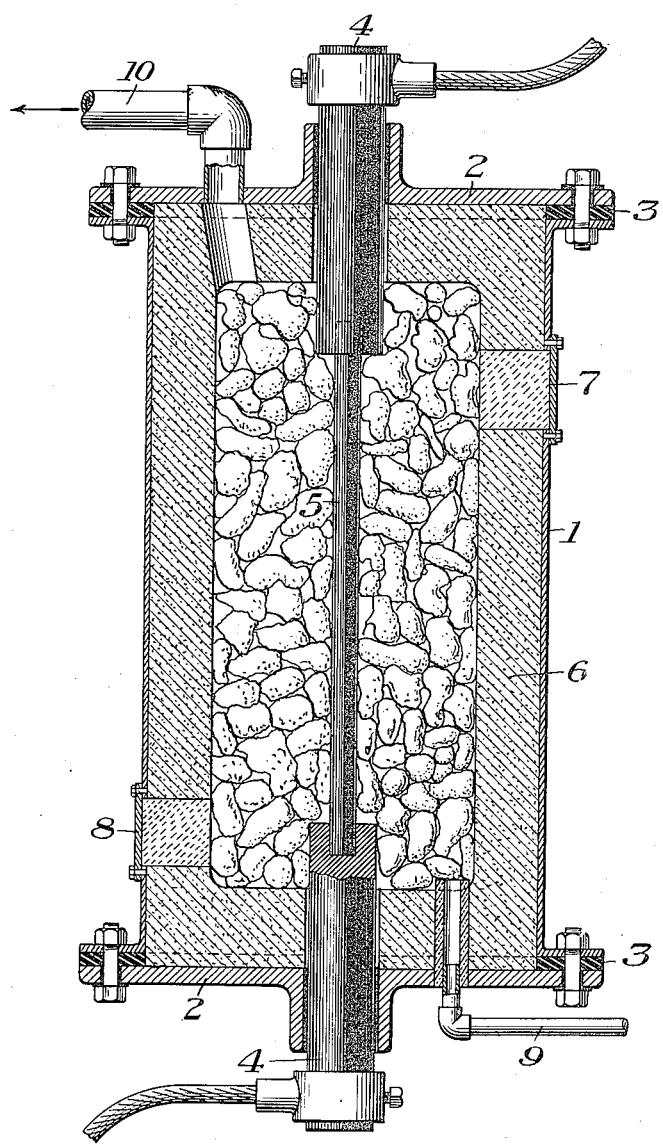
WITNESSES
INVENTOR

UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD FOR THE PRODUCTION OF SILICON TETRACHLORID.

1,271,713.        Specification of Letters Patent.        Patented July 9, 1918.

Application filed October 30, 1917. Serial No. 199,283.

*To all whom it may concern:*

Be it known that I, OTIS HUTCHINS, a citizen of the United States, residing at Niagara Falls, in the county of Niagara and State of New York, have invented a new and useful Method for the Production of Silicon Tetrachlorid, of which the following is a full, clear, and exact description, reference being had to the accompanying drawings, forming a part of the same.

The drawing is a longitudinal vertical section of one form of electric furnace which may be employed in carrying out my invention.

Silicon tetrachlorid, when pure, is a colorless liquid with a boiling point of 56.9° C. The specific gravity is 1.524. It has the chemical formula $SiCl_4$ and contains 16.7% silicon and 83.7% chlorin.

I have discovered that this compound can be made by passing dry chlorin over silicon carbid heated to a temperature of 1000° C. or above. In one method of working my invention, finely ground silicon carbid is placed in a fused silica tube which is heated externally by means of resistance wire wound about the tube. With this arrangement a temperature of 1100° C. can easily be obtained within the silica tube. Chlorin which has been dried by passing through concentrated sulfuric acid or dried by other well-known methods is passed through this tube over the silicon carbid. The silicon carbid is decomposed according to the following equation, forming silicon tetrachlorid, which passes off as a gas, and carbon, which remains behind in the form of graphite.

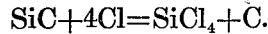

$$SiC + 4Cl = SiCl_4 + C.$$

The silicon tetrachlorid vapor is passed into a condenser which is cooled by water and is condensed to a liquid and can be collected at the bottom of the condenser. It is necessary that moisture be excluded from all parts of this process, as silicon tetrachlorid hydrolyzes instantly when in contact with moisture, forming silica and hydrochloric acid. Preferably the apparatus is so designed as to exclude all gases except the chlorin. The speed of the reaction for the formation of silicon tetrachlorid depends upon the concentration of chlorin and upon the temperature. Very finely ground silicon carbid begins to react with chlorin at temperatures of approximately 1000° C. At 1200° C., the reactions proceed with considerable rapidity. With relatively coarse grits of silicon carbid, the reaction proceeds with considerable slowness until a temperature of 1200° C. is reached.

I do not limit myself to the use of silicon carbid in the exact form mentioned above nor do I limit myself to the particular form of heating described above. For silicon carbid I may use the crude masses of crystals as it comes from the silicon carbid electric furnace or I may use this material broken down into grits of various sizes. I may also use silicon carbid powders. I may use lower grade silicon carbid materials or amorphous silicon carbid, generally known under the tradename of carborundum firesand, containing approximately 75% silicon carbid. I may also use other silicon carbid furnace products containing appreciable amounts of silicon carbid. I may also use the refuse material from manufactured products containing silicon carbid.

While I have described the use of a wire wound electric resistance furnace, other types of electric furnaces will be found better adapted for large scale operations. For instance, a furnace composed of an iron cylindrical shell having a refractory lining and having an electrical heater composed preferably of carbon passing through the center. The silicon carbid material may be packed around the heater and the chlorin passed in at one end of the cylinder with an outlet at the other end. The carbon heater may be heated by electrical current of suitable strength to give the desired temperature.

The furnace which I have illustrated in the drawing consists of a vertical cylindrical steel shell 1, having heads 2 secured upon each end, with interposed insulating gaskets 3. 4 designates the carbon terminals which are set in the heads 2 and are connected with a suitable source of electrical energy. 5 is a carbon resistor rod which connects the terminals 4 and constitutes the heating element of the furnace. 6 designates a suitable lining for the shell and heads of insulating and refractory material, such as fire sand. Suitable openings 7 and 8 are provided for introducing the charge material and for discharging the residue after the completion of a run. The chlorin is introduced at the bottom through an inlet pipe 9, and the silicon tetrachlorid gases are taken off through the top of the furnace by an outlet pipe 10, which is connected to a suitable condenser (not shown). The charge is placed around the resistor 5, and occupies the entire reaction chamber.

Instead of using the resistance heater above described any suitable means of electrical heating may be substituted, for example, the use of two electrodes inserted in the mass of silicon carbid and generating a heated zone therein either by the electric arc or by the resistance of the material of the charge.

I may also use fuel heat to produce the temperature desired. In this case, I may place the silicon carbid material in refractory pipes or retorts, these containers being surrounded by flame from coal gas or oil, chlorin being passed over or through the silicon carbid material within the containers.

I claim.

1. The process of producing silicon tetrachlorid which consists in passing chlorin over silicon carbid heated to a temperature sufficient to cause the chlorin to decompose the silicon carbid and combine with the silicon.

2. The process of producing silicon tetrachlorid by passing chlorin over silicon carbid heated to a temperature of at least 1000° C.

3. The process of producing silicon tetrachlorid by passing chlorin through a mass of silicon carbid which has been heated to 1000° C. by means of electrically developed heat.

4. The process of producing silicon tetrachlorid which comprises heating silicon carbid to a temperature of at least 1000° C., and passing dry chlorin over the heated silicon carbid.

In testimony whereof, I have hereunto set my hand.

OTIS HUTCHINS.